United States Patent
Xu et al.

(10) Patent No.: US 11,132,248 B2
(45) Date of Patent: Sep. 28, 2021

(54) AUTOMATED INFORMATION TECHNOLOGY SYSTEM FAILURE RECOMMENDATION AND MITIGATION

(71) Applicant: NEC Laboratories America, Inc., Princeton, NJ (US)

(72) Inventors: Jianwu Xu, Titusville, NJ (US); Haifeng Chen, West Windsor, NJ (US)

(73) Assignee: NEC Corporation

( * ) Notice: Subject to any disclaimer, the term of this patent is extended or adjusted under 35 U.S.C. 154(b) by 49 days.

(21) Appl. No.: 16/673,144

(22) Filed: Nov. 4, 2019

(65) Prior Publication Data
US 2020/0174870 A1    Jun. 4, 2020

Related U.S. Application Data

(60) Provisional application No. 62/772,743, filed on Nov. 29, 2018.

(51) Int. Cl.
*G06F 11/07* (2006.01)
*G06K 9/62* (2006.01)

(52) U.S. Cl.
CPC ........ *G06F 11/079* (2013.01); *G06F 11/0709* (2013.01); *G06F 11/0769* (2013.01);
(Continued)

(58) Field of Classification Search
CPC ............... G06F 11/079; G06F 11/0793; G06F 11/3072; G06F 11/3075; G06F 11/3082;
(Continued)

(56) References Cited

U.S. PATENT DOCUMENTS

| 6,671,683 B2 | 12/2003 | Kanno |
| 7,231,388 B2 | 6/2007 | Matsubayashi et al. |

(Continued)

FOREIGN PATENT DOCUMENTS

CN    108181547 B   *   5/2020   ........... G01R 31/086

OTHER PUBLICATIONS

Al-Namat et al., "SparseDTW: A Novel Approach to Speed up Dynamic Time Warping", 2012, School of Computer Science and Engineering The University of New South Wales, pp. 1-17 (Year: 2012).*

(Continued)

*Primary Examiner* — Gabriel Chu
(74) *Attorney, Agent, or Firm* — Joseph Kolodka (57) ABSTRACT

A method for implementing automated information technology (IT) system failure recommendation and mitigation includes performing log pattern learning to automatically generate sparse time series for each log pattern for a set of classification logs corresponding to a failure, performing multivariate log time series extraction based on the log pattern learning to generate a failure signature for the set of classification logs, including representing the sparse time series as a run-length encoded sequence for efficient storage and computation, calculating a similarity distance between the failure signature for the set of classification logs and each failure signature from a failure signature model file, determining a failure label for the failure corresponding to a most similar known failure based on the similarity distance, and initiating failure mitigation based on the failure label.

17 Claims, 7 Drawing Sheets

(52) U.S. Cl.
CPC ...... *G06F 11/0772* (2013.01); *G06F 11/0778* (2013.01); *G06F 11/0784* (2013.01); *G06K 9/6256* (2013.01)

(58) Field of Classification Search
CPC ............. G06F 11/3447; G06F 11/3452; G06F 11/3476; G06F 2201/835; G06N 3/08; G06N 3/088; G06N 5/047; G06N 20/00; H04L 41/0604; H04L 41/0631; H04L 41/064; H04L 41/0654; H04L 41/16; G05B 23/0229; G05B 23/0281; G06K 9/00523; G06K 9/0053; G06K 9/00543; G06K 9/0055; G06K 9/6201; G06K 9/6215; G06K 9/6227; G06K 9/6256; G06K 9/6262; G06K 9/6288; G06K 9/629

See application file for complete search history.

(56) References Cited

U.S. PATENT DOCUMENTS

| | | | |
|---|---|---|---|
| 2003/0139905 A1* | 7/2003 | Helsper | G06F 11/3055 702/182 |
| 2010/0223499 A1* | 9/2010 | Panigrahy | G06F 11/079 714/19 |
| 2014/0195474 A1* | 7/2014 | Anguera Miro | G06N 5/047 706/48 |
| 2016/0042053 A1* | 2/2016 | De Sousa Webber | G06F 16/35 707/739 |
| 2016/0239756 A1* | 8/2016 | Aggour | H04L 41/147 |
| 2017/0010930 A1* | 1/2017 | Dutta | G06F 11/0772 |
| 2017/0208080 A1* | 7/2017 | Sakamoto | G06N 20/00 |
| 2018/0060314 A1 | 3/2018 | Xu et al. | |
| 2019/0318288 A1* | 10/2019 | Noskov | G06N 20/00 |
| 2019/0377905 A1* | 12/2019 | Rose | G06F 21/00 |

OTHER PUBLICATIONS

Smeulders, "Content-Based Image Retrieval at the End of the Early Years", IEEE Transactions on Pattern Analysis and Machine Intelligence, Dec. 2000, pp. 1349-1380.

Hamooni, "LogMine: Fast Pattern Recognition for Log Analytics", 25th ACM International Conference on Information and Knowledge Management, 2006, pp. 1573-1582.

Sokal, "A Statistical Method for Evaluating Systematic Relationships", University of Kansas Science Bulletin, vol. 28, Aug. 2011, pp. 1409-1438.

Zyrtax, http://www.zytrax.com/tech/web/regex.htm, Jul. 2018, 32 pages.

Smith, "Identification of Common Molecular Subsequences", Journal of Molecular Biology, vol. 147, No. 2, Mar. 1981, pp. 195-197.

Ning, "HLAer: A System for Heterogeneous Log Analysis", SMD Workshop on Heterogeneous Learning, Jul. 2014, 22 pages.

Logstash, https://www.elastic.co/products/logstash, Mar. 2019, 16 pages.

* cited by examiner

AUTOMATED INFORMATION TECHNOLOGY SYSTEM FAILURE RECOMMENDATION AND MITIGATION

RELATED APPLICATION INFORMATION

This application claims priority to provisional application Ser. No. 62/772,743, filed on Nov. 29, 2018, incorporated by reference herein in its entirety.

BACKGROUND

Technical Field

The present invention relates to information technology (IT) systems, and more particularly to automated IT system failure recommendation and mitigation.

Description of the Related Art

Failures can occur from time-to-time in information technology (IT) systems (e.g., cloud computing IT systems). System administrators may be interested in determining whether a new system failure has been encountered before, since such information can help the system administrators perform system maintenance by retrieving mitigation solutions from the past incident of the same type of system failure. Computer system log information can be used to implement log-based system maintenance and monitoring management technology. For example, when an unknown system failure occurs, system administrators can feed such log information into a log-based failure recommendation engine.

SUMMARY

According to an aspect of the present invention, a method for implementing automated information technology (IT) system failure recommendation and mitigation is provided. The method includes performing log pattern learning to automatically generate sparse time series for each log pattern for a set of classification logs corresponding to a failure, performing multivariate log time series extraction based on the log pattern learning to generate a failure signature for the set of classification logs, including representing the sparse time series as a run-length encoded sequence for efficient storage and computation, calculating a similarity distance between the failure signature for the set of classification logs and each failure signature from a failure signature model file, determining a failure label for the failure corresponding to a most similar known failure based on the similarity distance, and initiating failure mitigation based on the failure label.

In accordance with another embodiment of the present invention, a system for implementing automated information technology (IT) system failure recommendation and mitigation is provided. The system includes a memory device for storing program code and at least one processor device operatively coupled to the memory device. The at least one processor device is configured to execute program code stored on the memory device to perform log pattern learning to automatically generate sparse time series for each log pattern for a set of classification logs corresponding to a failure, perform multivariate log time series extraction based on the log pattern learning to generate a failure signature for the set of classification logs by representing the sparse time series as a run-length encoded sequence for efficient storage and computation, calculate a similarity distance between the failure signature for the set of classification logs and each failure signature from a failure signature model file, determine a failure label for the failure corresponding to a most similar known failure based on the similarity distance, and initiate failure mitigation based on the failure label.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Since computer logs can be in structured or unstructured format, text mining methodology could be used to extract relevant features for system failures. In text document classification systems (and content-based image classification systems), features based on content (e.g., text or image pixels) can be extracted and used to form a feature vector representing the content, and a similarity score can be computed for any pair of content based on their feature vectors. In these cases, static features can be extracted to represent the content, since there may not be time-related dynamics embedded in the documents or images. On the other hand, computer system logs ("logs"), such as, e.g., heterogeneous logs, can include data time stamps and event information, which include non-static (dynamic) information that can be used to characterize underlying systems. The interaction among different software application components can be recorded in the time aspect of logs. Such logs can act as communication footprints of different software components at different execution stages and can store system information both in normal operation and abnormal stages.

To address the dynamic nature of log data, the embodiments described herein can perform automated information technology (IT) system failure recommendation based on sparse multivariate log pattern time series. More specifically, the embodiments described herein can automatically classify unknown system failures based on the sparse multivariate log pattern time series, which can include extracting relevant information from a vast number of logs that can be generated during execution of a software system (e.g., large-scale software system) coupled with different types of hardware components (e.g., central processing units (CPUs), memory, motherboards).

Moreover, when multiple instances of the same type of failure become available, the embodiments described herein can enhance signatures representing the failure type to more accurately capture failure characteristics. The embodiments described herein can determine the most likely known system failures based on a similarity distance computation between the unknown system failure signature and known system failure signatures. More specifically, the similarity between the system failures can be defined by the aggregated pair-wise dynamic time warping (DTW) distance. The DTW distance can be used to characterize the shortest distance between two run-length encoded sparse time series for each log template. The run-length encoding mechanism can provide an efficient method to store the original sparse time series.

In an illustrative scenario, when a system failure happens in a certain software unit or component, the failure might propagate into other components. For example, when a database fails due to a hard disk issue, a front-end application component can begin having difficulty accessing the content from database. As database access errors accumulate, the front-end application component can generate more and more logs with error information, which suggests database connection failure and finally the normal functionality fails. The log information may indicate that both database and front-end application components fail, but the real root cause resides in the database server. Accordingly, in this illustrative scenario, the embodiments described herein can distill the noise from the right signal, and can extract the most relevant features related to the right root cause of failure, namely the database server.

The embodiments described herein can increase log-based failure recommendation system accuracy to improve the ability of a user (e.g., a system administrator) to perform fault diagnosis and mitigate failures (e.g., improved precision and/or recall of results of the log-based failure recommendation system). For example, the embodiments described herein can recommend a label of a system failure to the user to perform the fault diagnosis and mitigation. If the system failure corresponding to the label has previous happened, then the user can use a previously successful mitigation solution to fix the system failure.

Figure 1:
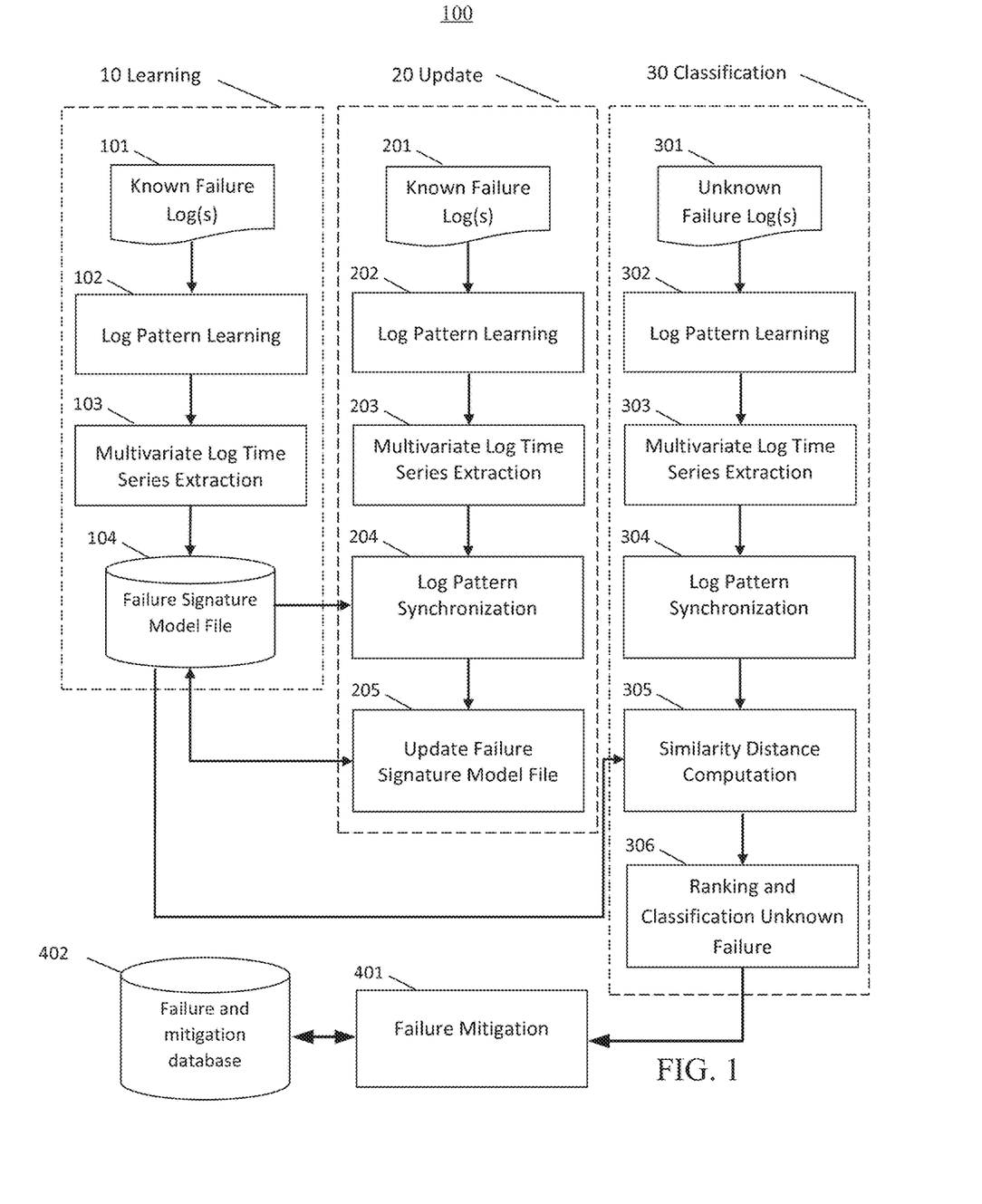
FIG. 1 is a block/flow diagram of a high-level overview of system/method for implementing automated information technology (IT) system failure recommendation, in accordance with an embodiment of the present invention.

Referring now in detail to the figures in which like numerals represent the same or similar elements and initially to FIG. 1, a block/flow diagram is provided illustrating a high-level overview of an exemplary system/method 100 for implementing automated information technology (IT) system failure recommendation.

The system/method 100 can include a plurality of stages, including a learning stage 10, an update stage 20 and a classification stage 30.

During the learning stage 10, a failure signature is generated based on a set of one or more known system failure logs. Syntactic log formats can be discovered directly from the logs and multivariate time series for each log pattern can be produced. The multivariate time series can be represented by run-length encoding schema due to efficient storage and fast distance computation during the classification stage 30.

More specifically, a set of known failure logs 101 is obtained. The set 101 corresponds to a set of training logs. The set 101 can include one or more known failure logs. The set 101 can include one or more heterogeneous logs obtained from arbitrary systems or software applications that produce logs to record system events, status or any other information. The set 101 can include unstructured text content with one or multiple fields, and can include timestamps to record when a particular event occurs in the originating system. The set 101 can correspond to a certain system failure that has been identified by system administrators. The set 101 may contain both normal and abnormal (e.g., error) logs because system administrators might not pinpoint the exact starting and ending time of system failure. The set 101 can transported via streaming process, message transporter, file transfer, or any other suitable manner.

The set 101 can then be received by a log pattern learning component 102 configured to perform log pattern learning. The goal of log pattern learning is to automatically generate sparse time series for each log pattern for the set 101 so that two sets of logs can be compared. A log pattern is the syntactic information of any log messages, which corresponds to the print out statements in the source code. Performing log pattern learning can include generating log syntactic formats directly from log messages. This can be done without human supervision (e.g., automatic generation) by comparing unknown system failure logs to known system failure logs. In one embodiment, a common log format dictionary can be used to perform the comparison. Further details regarding the log pattern learning component 102 are described below with reference to FIG. 2.

Figure 2:
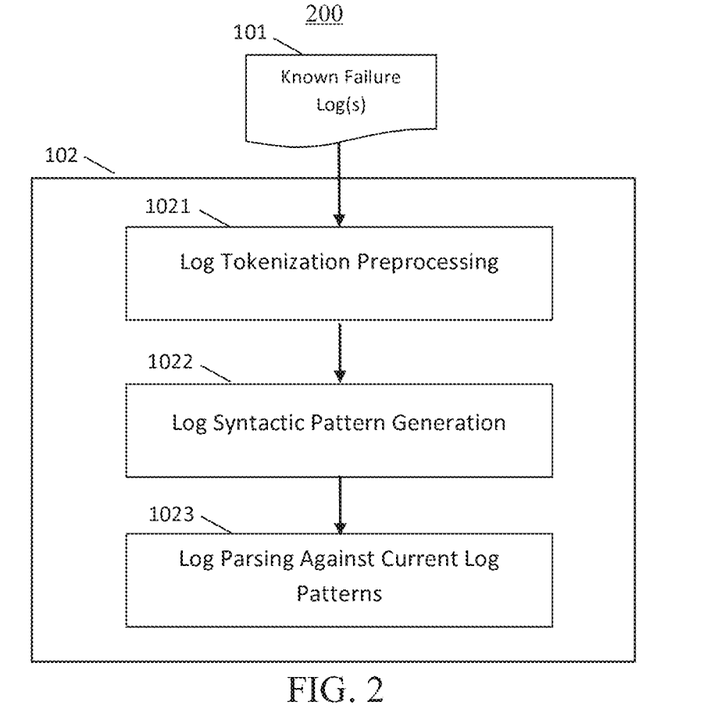
FIG. 2 is a block/flow diagram of a system/method for implementing a log pattern learning component within the system/method of FIG. 1, in accordance with an embodiment the present invention.

With reference to FIG. 2, a block/flow diagram is provided illustrating a system/method 200 for performing log pattern learning. As shown, a set of known failure logs, or training set, 101 is received by a log pattern learning component 102, as described above with reference to FIG. 1. As further shown, the log pattern learning component 102 can include a log tokenization preprocessing subcomponent 1021, a log syntactic pattern generation subcomponent 1022, and a log parsing against current log patterns subcomponent 1023.

The subcomponent 1021 is configured to perform tokenization preprocessing on the set 101. Tokens are the smallest units of the operational logs, which are the building element of a composite log. Therefore, the tokenization preprocessing can bring semi-structure information into the unstructured logs. The tokenization preprocessing can be performed by splitting the original logs with a set of delimiters, which can include predefined and/or user-supplied delimiters. The technique can be applicable in both single-byte and multi-byte character encodings, which applicability to many different language settings used in different countries. Various types of time stamp formats can also be recognized, matched and standardized. The subcomponent 1021 can be further configured to provide an interface for users to manually input rules, and tokenize the logs if any strings are matched against the rules. Furthermore, the subcomponent 1021 can provide an interface for users to provide the structure of specific log format such as CSV (Comma Separated Values) files.

One element of (heterogeneous) logs is the log syntactic pattern (structural information), or regular expression, which is the generation schema to produce the logs. The log syntactic formats capture the structural information of the logs.

The subcomponent 1022 is configured to generate log syntactic patterns from the unstructured logs. More specifically, the subcomponent 1022 can produce log syntactic formats using a clustering algorithm (e.g., an automated unsupervised clustering algorithm). The clustering algorithm aggregates multiple logs with similar structural information into clusters. The similarity measure is defined as the token category similarity. Once the logs are aggregated into clusters, the subcomponent 1022 can merge all of them to produce a final regular expression format as the log syntactic formats.

Each merge step can leverage a log format aligning algorithm (e.g., the Smith-Waterman algorithm). Initially, the sequential merge process is utilized. After several rounds of merge operations, an Unweighted Pair Group Method with Arithmetic Mean (UPGMA) method may be used when sequential merge fails to produce good performance. A cost function that determines the generality of formats can be used to identify the end of pattern recognition procedure once the cost is within certain pre-defined threshold. Each token generated by the subcomponent 1021 can be treated as a unit and a log is an ordered composition of all tokens. Therefore, if token units switch orders, then the subcomponent 1022 will produce different syntactic formats.

The subcomponent 1023 is configured to extract all relevant string content from the logs by parsing the logs against the log syntactic patterns, and transform the unstructured logs into structured tokens by analyzing the logs through regular expression matching. The string content can include data including, but not limited to, time stamp information, numbers, words, etc. Given the list of existing log patterns, the subcomponent 1023 can match the logs against the list of regular expressions one-by-one. Illustratively, Logstash can be used to parse an input log given a regular expression as the log pattern model. Logstash is an open source software package which is a general log parsing engine. Any input log can be either matched to any of the existing log patterns (regular expressions), or not matched at all.

Referring back to FIG. 1, a multivariate log pattern sequence extraction component 103 is configured to perform multivariate log pattern sequence extraction based on the log pattern learning to generate a failure signature for the set 101. Performing multivariate log pattern sequence extraction can include extracting time dynamics information of each log pattern and forming multivariate time sequences for the set 101. Most log patterns will contain the time stamp field. Therefore, for each log pattern, the frequency of occurrence can be extracted at each time stamp. In order to achieve efficiency and fast computation, the sparse time series can be represented as a run-length encoded sequence by implementing a run-length encoding method. Further details regarding the component 103 are described below with reference to FIG. 3.

Figure 3:
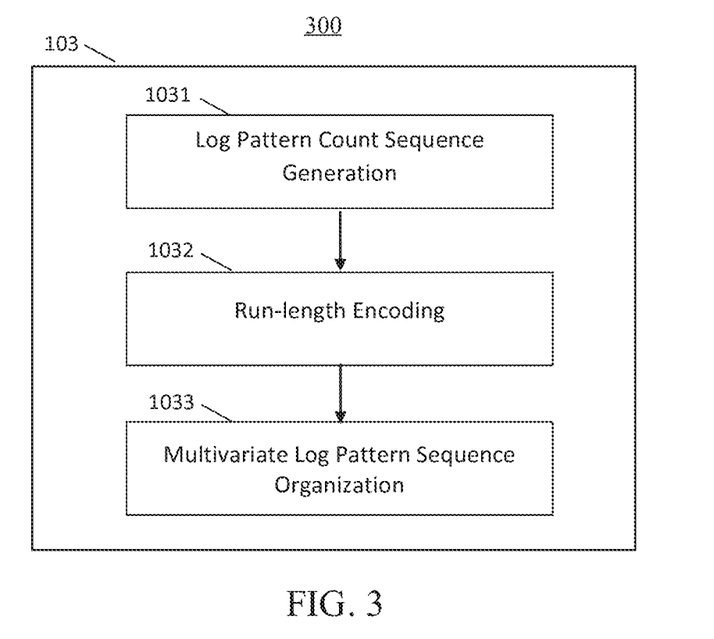
FIG. 3 is a block/flow diagram of a system/method for implementing a multivariate log time series extraction component within the system/method of FIG. 1, in accordance with an embodiment the present invention.

With reference to FIG. 3, a block/flow diagram is provided illustrating a system/method 300 for performing multivariate log pattern sequence extraction. As shown, the multivariate log time series extraction component 103 can include a log pattern count sequence generation subcomponent 1031, a run-length encoding subcomponent 1032, and a multivariate log pattern sequence organization subcomponent 1033.

The subcomponent 1031 is configured to generate a log pattern count sequence for each log pattern. Frequency counting can be used to generate each log pattern count sequence. More specifically, the subcomponent 1031 can extract a time stamp for a log message and count a number of log messages that appear at that time stamp for each log pattern.

The subcomponent 1032 is configured to apply run-length encoding for each log pattern count sequence. The run-length encoding mechanism can be used to generate an efficient representation of log pattern count sequence for subsequent fast computation. Run-length encoding can represent the log pattern count sequence in a very compact manner and serves the purpose of using dynamic time warping (DTW) distance computation in the failure classification stage.

For example, suppose one log pattern count sequence is initially generated from subcomponent 1031 as T=<5,0,0,0, 2,4,1,0,0,0,0,0,0,2>. Because the log messages corresponding to the same log pattern will most likely appear in different time stamps, the pattern count sequence could be quite sparse which means the sequence T will contain many 0s. The run-length encoding performed by the subcomponent 1032 can replace a run of k zeros in the sequence T with a−k, which represents the duration of zeros. The run-length encoded sequence for T will then be $T_e$=<5,−3,2,4,1,−6,2>. Accordingly, the run-length encoding has compressed a run of zeros by the length of the run.

The subcomponent 1033 is configured to repeat the procedures of the subcomponents 1031 and 1032 for each log pattern. After the entire process has completed, the final set of multivariate log pattern count run-length encoded sequences is obtained to represent training logs (e.g., the training logs 101 of FIG. 1).

Referring back to FIG. 1, the component 103 can generate a failure signature (or log signature) model file stored in a database 104 as a signature for the set 101. The model file can index the log signature feature vectors for the system failure logs. In one embodiment, JSON (JavaScript Object Notation) format can be used to store the failure signature. Each item or entry in the model file can be a key-value pair, where the key is the individual log pattern and the value is the corresponding run-length encoded log pattern count sequence.

As will be described in further detail below, the model file can be used later on model update and unknown system failure classification stages. There can be multiple update stage components implemented in a cascading manner to continuously update the model file. This structure provides flexibility in accommodating multiple instances of the same type of failure category or different types of failures. One purpose of the updating is to incorporate different application instances into the same model file.

One application scenario is to classify similar failures occurring at different times in the same system. On the other hand, the update text log can be obtained from a different system instance from the one in the learning stage 10. For example, two copies of the same software application can be executed in different sites with overlapping semantic information. The heterogeneous logs can then be transported into the update stage 20 in the same or similar manner as in the learning stage 10.

More specifically, during the update stage 20, another set of known system failure logs 201 can be obtained. The set 201 corresponds to a set of update logs. The set 201 can have the same failure category as the one in the model file or can be of a different system failure. The set 201 can have the same format as the set 101 and can be generated from the same system as the set 101.

The set 201 can be received by a log pattern learning component 202 configured to perform log pattern learning on the set 201 to automatically generate sparse time series for each log pattern for the set 201, similar to the log pattern learning component 102 described above.

A multivariate log pattern sequence extraction component 203 can perform multivariate log time series extraction based on the log pattern learning to generate a failure signature (or log signature) model file or database as a signature for the set 201, similar to the component 103 described above. More specifically, the sparse time series for each log pattern for the set 201 can be represented as a run-length encoded sequence for efficient storage and computation.

Since some common log patterns might exist in both learning logs and model update logs, and because the component 102 is applied to each set of logs individually, the log patterns generated from the two processes might have common log patterns but with different log pattern identifiers.

Thus, a log pattern synchronization component 204 can synchronize the log pattern identifiers across different executions of update stages to generate a log pattern synchronization. Further details regarding the operation of the component 204 will now be described below with reference to FIG. 4.

Figure 4:
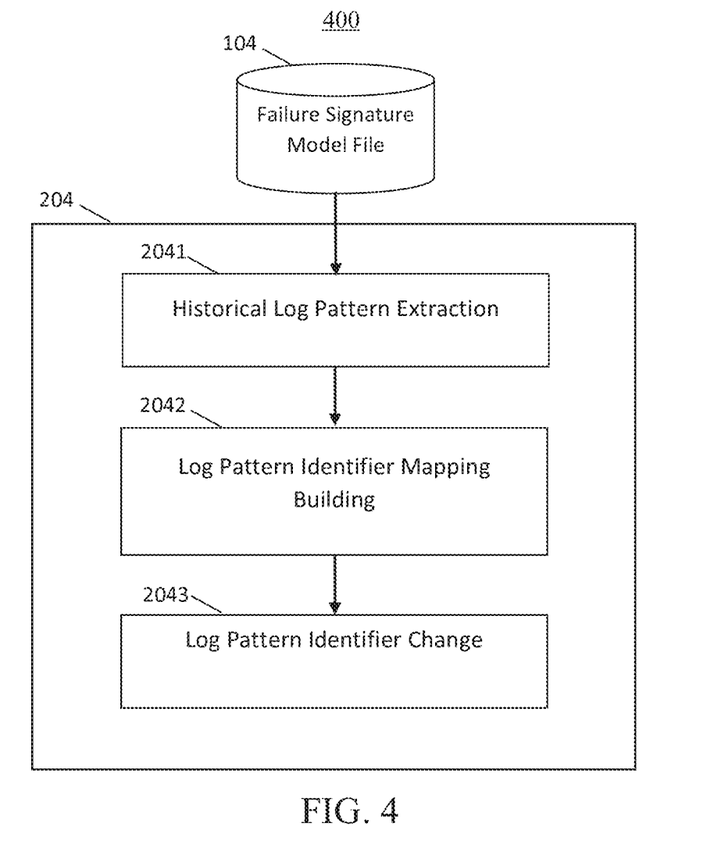
FIG. 4 is a block/flow diagram of a system/method for implementing a log pattern synchronization component within the system/method of FIG. 1, in accordance with an embodiment of the present invention.

With reference to FIG. 4, a block/flow diagram is provided illustrating a system/method 400 for performing log pattern synchronization. As shown, a model file is received by a log pattern synchronization component 102 from a database 104, as described above with reference to FIG. 1. As further shown, a log pattern synchronization component 204 can include a historical log pattern extraction subcomponent 2041, a log pattern identifier mapping building subcomponent 2042, and a log pattern identifier change subcomponent 2043.

The subcomponent 2041 is configured to extract historical log patterns from the model file that will be used to perform log pattern synchronization. This is because the previous log pattern models are stored in the model file (e.g., in a JSON format). The subcomponent 2041 can further extract pattern identifiers from the model file. Each extracted log pattern can be in regular expression format and have an associated identifier.

The subcomponent 2042 is configured to build a log pattern identifier mapping from the new update log patterns into the historical log patterns in the model file. More specifically, a same log pattern regular expression can be found and the new update log pattern identifier can be changed into the historical log pattern identifier for every new update log pattern. If the same historical log pattern cannot be found, this means that it is a new log pattern and the identifier is changed to the value as the maximal historical log pattern identifier, plus one. This procedure can ensure that both the existing log pattern identifiers from the model file are consistent with the generated log pattern identifiers (e.g., from the log pattern learning component 202 of FIG. 1).

Once the log pattern identifier mapping is built, the subcomponent 2043 is configured to change the log pattern identifiers in the multivariate run-length encoded time series (e.g., produced by the multivariate log pattern sequence extraction component 203 described above with reference to FIGS. 1 and 3). If the model is in JSON format with the log pattern identifier as the key and log pattern time series as the value, the subcomponent 2043 can change the original log pattern identifier in the JSON keys based on the mapping from the subcomponent 2042.

Referring back to FIG. 1, an update failure signature model file component 205 updates the model file based on the log pattern synchronization to generate an update, thereby updating and improving the model file with newly provided logs. Further details regarding the operation of the component 205 will now be described below with reference to FIG. 5.

Figure 5:
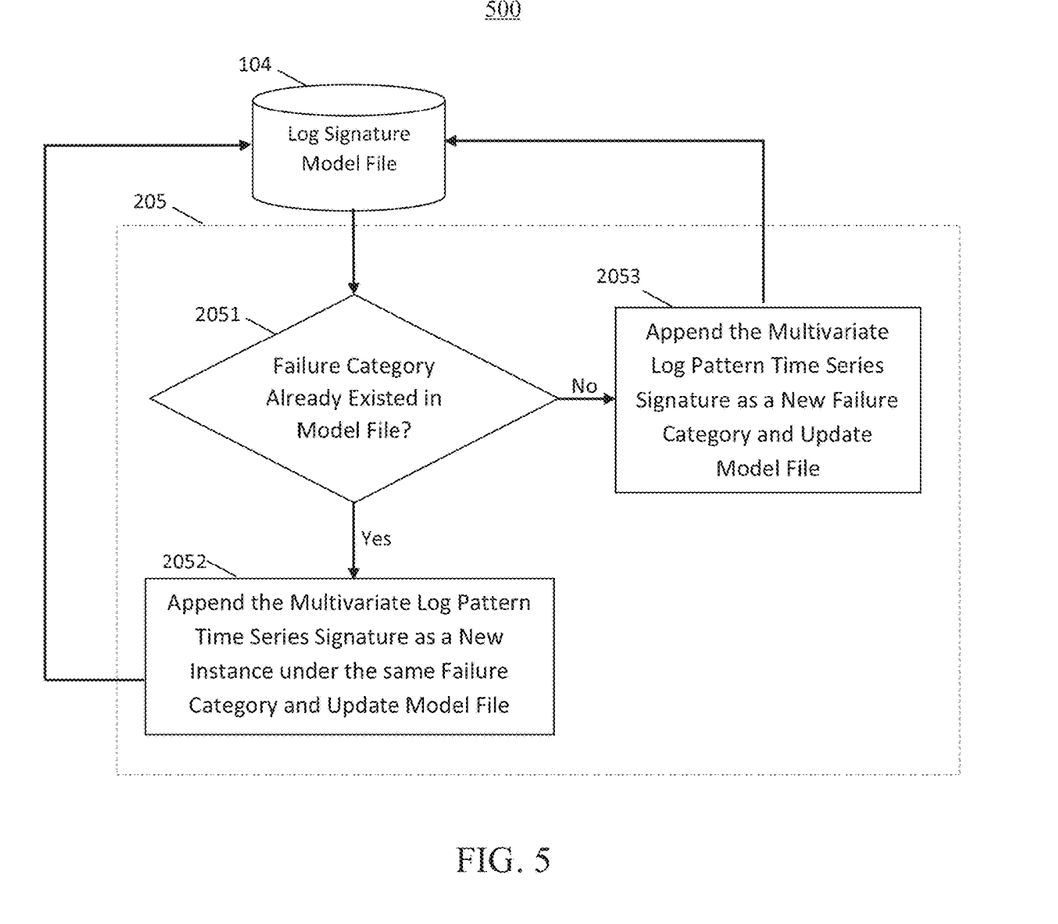
FIG. 5 is a block/flow diagram of a system/method for implementing an update failure signature model file component within the system/method of FIG. 1, in accordance with an embodiment the present invention.

With reference to FIG. 5, a block/flow diagram is provided illustrating a system/method 500 for updating a model file. As shown, a model file is received by an update failure signature model file component 205 from a database 104, as described above with reference to FIG. 1.

Because the model file stores the signatures based on failure categories, there may be multiple failure categories existing in the model file. During the update stage, multiple instances of update logs with the same failure category might be provided in accordance with the embodiments described herein to continuously update and refine the failure signature.

Since the model updating mechanism can be different based on the failure category in the update text logs, at block 2051, it is determined whether the failure category (from the new update logs) already exists in the model file. This can be achieved by comparing the failure category information from the new update logs against each existing failure category in the model file.

If it is determined that the failure category already exists, then the multivariate log pattern time series signature is appended as a new instance under the same failure category, and the model file is updated. Under this condition, the new signature with multivariate run-length encoded time sequences can be appended to the existing signature model of the same failure category. In this case, the new model is treated as another instance for similarity computation during the classification stage.

Otherwise, the new update log is determined to correspond to another failure category. In this scenario, the failure signature from the current update logs can be appended to the model file as a new type of failure category.

Referring back to FIG. 1, during the classification stage 30, testing logs are classified into any of the existing failure categories, or as unknown failures. One purpose of the classification stage 30 is to provide fault diagnosis and aid system administrators in finding the right failure category.

More specifically, a set of unknown failure logs 301 can be obtained. The set 310 can correspond to a set of classification logs corresponding to an unknown failure. The set 301 can be in the same format as the sets 101 and 201. The set 301 is generated for further analysis and diagnosis in response to system failure. The set 301 can be transported into the classification stage 30 in the same or similar manner as in the learning stage 10.

The set 301 can be received by a log pattern learning component 302 configured to perform log pattern learning to automatically generate sparse time series for each log pattern for the set 301, similar to the log pattern learning components 102 and 202 described above.

A multivariate log pattern sequence extraction component 303 can perform multivariate log time series extraction based on the log pattern learning to generate a failure signature for the set 301, similar to the components 103 and 203 described above. More specifically, the sparse time series for each log pattern for the set 301 can be represented as a run-length encoded sequence for efficient storage and computation.

A log pattern synchronization component 304 can synchronize the log pattern identifiers across different executions of update stages to generate a log pattern synchronization, similar to the component 204 described above.

Once the failure signature from the classification logs is extracted and log pattern identifiers are synchronized against the model file, a similarity distance computation component 305 can calculate a similarity distance between the failure signature for the set of classification logs and each failure signature from the model file. The purpose of this computation is to find the closest failure category from the model file based on the similarity distance for the unknown failure logs. Further details regarding the operation of the component 305 will now be described below with reference to FIG. 6.

Figure 6:
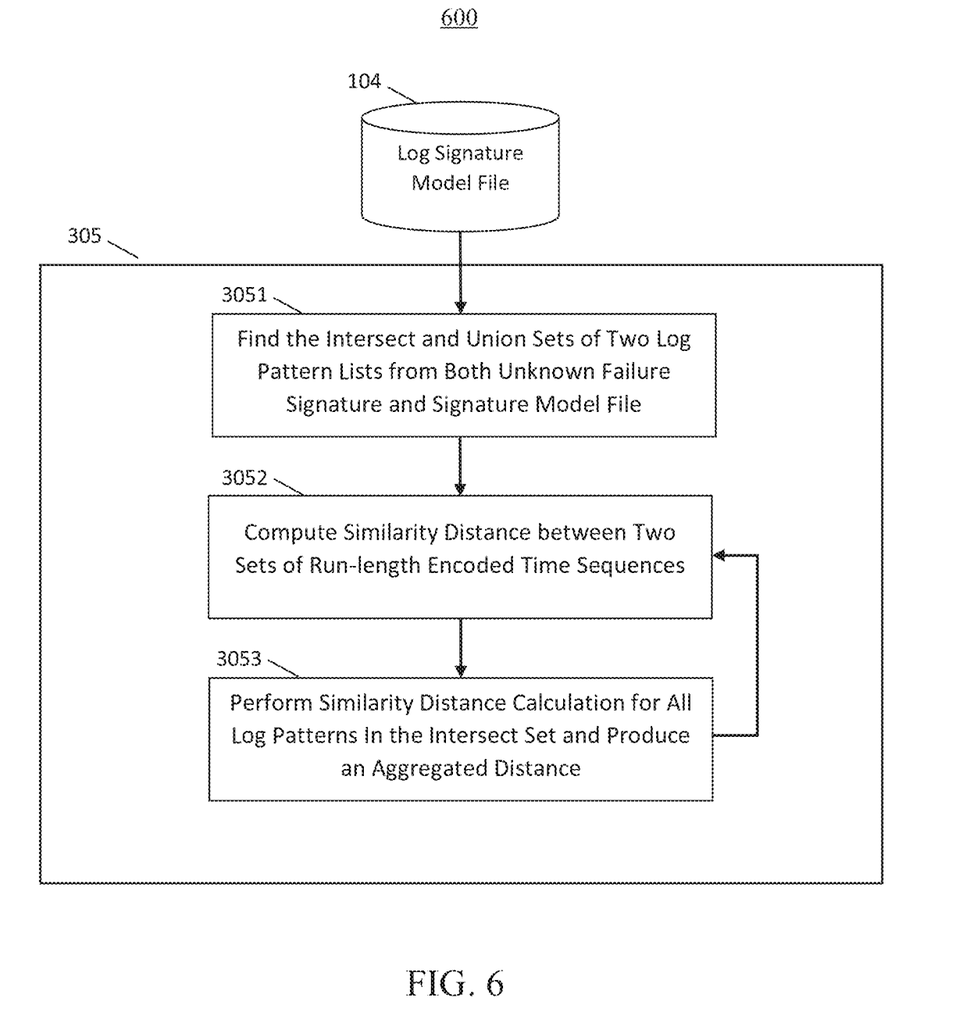
FIG. 6 is a block/flow diagram of a system/method for implementing a similarity distance computation component within the system/method of FIG. 1, in accordance with an embodiment of the present invention.

With reference to FIG. 6, a block/flow diagram is provided illustrating a system/method 600 for calculating a similarity distance between a failure signature for a set of classification logs and each failure signature from a failure signature model file. As shown, the model file is received by a similarity distance computation component 305 from a database 104, as described above with reference to FIG. 1.

The run-length encoded log pattern sequence corresponds to a specific log pattern, and components 204 and 304 described above with reference to FIGS. 1 and 4 have synchronized the log pattern identifiers against the log pattern dictionary in the model file. A subcomponent 3051 finds the intersection and union sets between the log patterns from the set of unknown failure logs and the ones from the model file. The intersection set can be used as the log pattern identifiers for similarity distance computation. The union log pattern set is the overall log patterns and the total number will be used as a normalization factor.

Since the embodiments described herein use run-length encoding for efficient storage and fast computation, a subcomponent 3052 can compute a similarity distance between two sets of run-length encoded time sequences. The run-length encoded log pattern counting time sequence can be sparse because the occurrence of log pattern may not be dense. Thus, sparse dynamic time warping (DTW) can be used to calculate the similarity distance. Such a DTW technique can consider the unequal sampling of the log pattern counts and find the shortest Euclidean distance between two run-length encoded time sequences. The similarity distance is $[0, \infty]$, with a 0 distance representing two sequences being the same. The complexity can be quadratic on the number of observations as opposed to the range of time of the time series.

A subcomponent 3053 can execute the operation of the subcomponent 3052 multiple times until the similarity distance computation has been performed for every log pattern in the intersection set. The subcomponent 3053 can aggregate all of the similarity distance values and divide the aggregation by the number of log patterns in the union set. A final normalized similarity distance can be used to represent a similarity between an unknown failure log signature and a particular failure category in the model file.

Referring back to FIG. 1, a ranking and classification unknown failure component 306 can be used to determine a failure label for the unknown failure corresponding to a most similar known failure based on the similarity distance (e.g., normalized similarity distance). More specifically, the component 306 can rank the similarity distances (e.g., in an ascending manner). Since it may be possible that the unknown failure is not be similar to any of the existing failure categories in the model file, a threshold can be used as a free parameter that a user can use to decide whether the normalized similarity distance generated by the component 305 is below the threshold. The threshold serves as a cutoff value to choose either a proper subset or the entire set from the ranked list. If the subset is not empty, then the highest-ranking failure category can be chosen as the final label for the unknown failure logs because the similarity distance between these two signatures is the smallest. If the subset is empty, then an "unknown" failure category can be returned. Accordingly, the system/method of FIG. 1 can be used to rank and classify unknown failure logs based on a failure signature model file.

Once a label corresponding to a system failure category is determined by the component 306, a failure mitigation component 401 can be used to initiate mitigation of the associated system failure for returning the system to its normal operation state. More specifically, the component 401 can either manually assist a user (e.g., a system administrator) with mitigating the system failure, or can be configured to automatically mitigate the system failure.

For example, a failure and mitigation database 402 can serve as a knowledge hub of system failure diagnoses and mitigation solutions. More specifically, the database 402 can include all historical system failures and corresponding mitigation solutions. Each failure stored in the database 402 can either be determined by the component 306, or manually decided by the component 401 as will be described in further detail below.

The label corresponding to a current failure category generated by the component 306 can be received by the component 401, and the component 401 can determine whether a historical failure category corresponding to the current failure category exists in the database 402. Based on this determination, a mitigation solution can be obtained.

For example, if the current failure category already exists as a historical failure category in the database 402, this means that the failure has been handled before. The mitigation solution associated with the corresponding historical failure category can then be applied to the current failure to mitigate and/or solve the issue. However, if the current failure category was not previously stored in the database 402, then the current failure category is determined to be an unknown failure category. Since the current failure category is unknown, the failure can be diagnosed and then mitigated or solved. The current failure label and the correct mitigation solution associated with the current failure label can then be stored in the knowledge database for future use. Accordingly, the database 402 can be updated in real-time.

Figure 7:
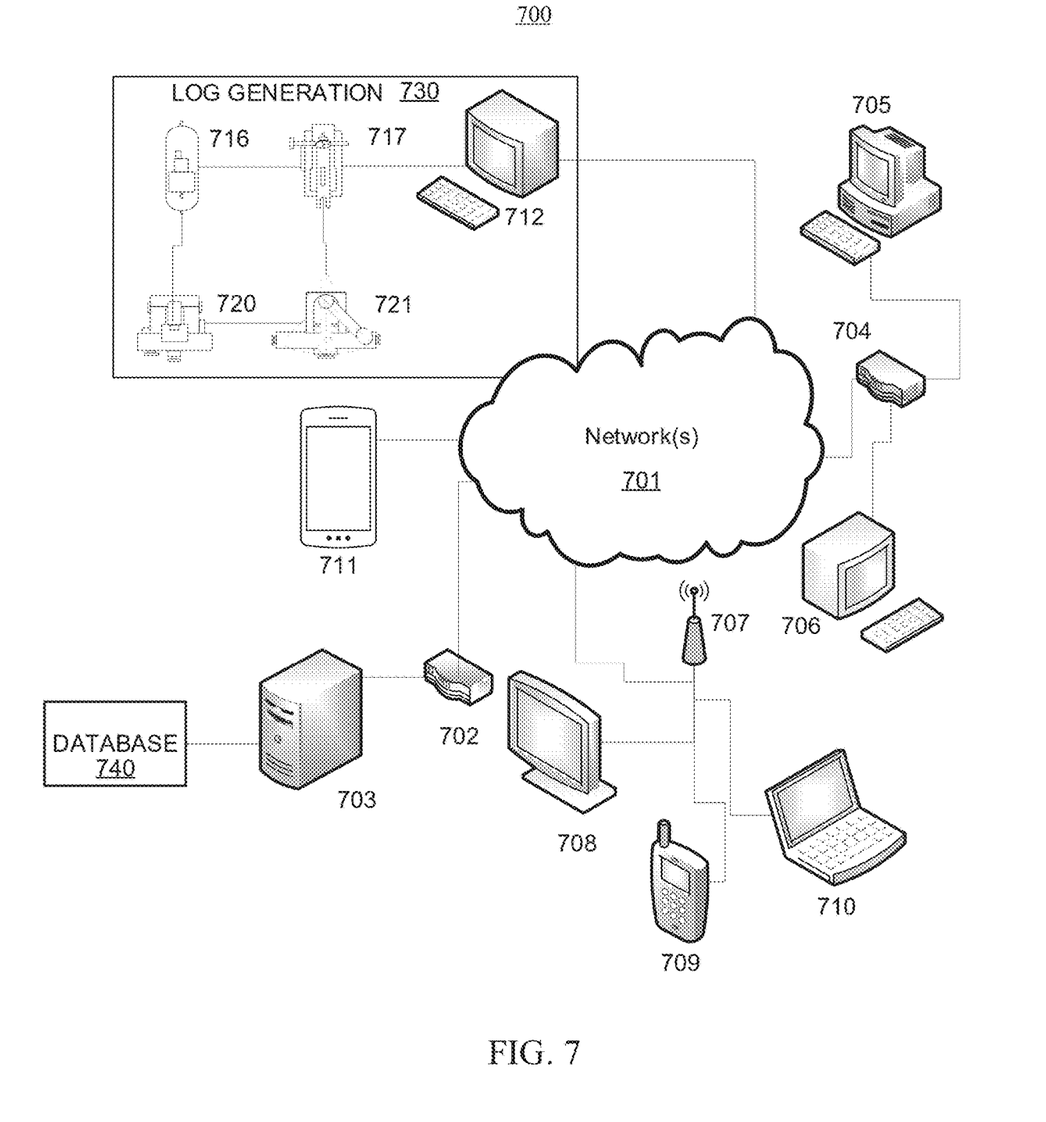
FIG. 7 is a diagram illustrating an exemplary environment implementing automated information technology (IT) system failure recommendation, in accordance with an embodiment of the present invention.

With reference to FIG. 7, a system 700 is provided illustrating an exemplary environment in which the embodiments described above with reference to FIGS. 1-6 can be implemented.

The system 700 can include one at least one processing device (e.g., server) 703 for storing information used by the system. In one embodiment, and as shown, the processing device 703 can be associated with a database 750. Applications or programs in the processing device 703 may retrieve and manipulate information in storage devices and exchange information through at least one network 701, which can illustratively include a wide-area network (WAN) (e.g., the Internet). Applications or programs in the processing device 703 may also be used to manipulate information stored remotely and process and analyze data stored remotely across the network 701.

According to an exemplary embodiment, as shown in FIG. 7, exchange of information through the network 701 and/or other network may occur through one or more high speed connections. In one embodiment, and as shown, high speed connections may be over-the-air (OTA), passed through networked systems, directly connected to the network 701 or directed through one or more routers 702. It is to be understood and appreciated that there are numerous ways the processing device 703 may connect to the network 701 for the exchange of information, and various embodiments of the invention are contemplated for use with any method for connecting to networks for the purpose of exchanging information. Further, while this application refers to high speed connections, embodiments of the invention may be utilized with connections of any speed.

Components, elements, or modules of the system may connect to the processing device 703 via the network 701 or other network in various ways. For instance, a component or module may connect to the system (i) through a computing device 712 directly connected to the network 701, (ii) through a computing device 705, 706 connected to the network 701 through a routing device 704, (iii) through a computing device 708, 709, 710, connected to a wireless access point 707, or (iv) through a computing device 711 via a wireless connection (e.g., CDMA, GMS, 3G, 4G, 5G) to the network 701. One of ordinary skill in the art will appreciate that there are numerous ways that a component or module may connect to the processing device 703 via network 701 or other network, and embodiments are contemplated for use with any method for connecting to the processing device 703 via network 701 or other network. Furthermore, the processing device 703 could be comprised of a personal computing device, such as a smartphone, acting as a host for other computing devices to connect to.

Users of the system 700 can interact with the system 700 via computing devices such as a laptop 710, personal computers 705, 706, 708, cell phones 709, smart phones 711, and the like. In one embodiment, a communicatively connected group of devices including sensors 716 and 717, specialized operational devices 720 and 721, and computing device 712 can be included as constituent elements in a log generation section 730 configured to generate logs during operation of an IT system.

The communications means of the system 700 can include any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, or any combination thereof. One of ordinary skill in the art will appreciate that there are numerous communications means that may be utilized with embodiments of the invention, and embodiments of the invention are contemplated for use with any communications means.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
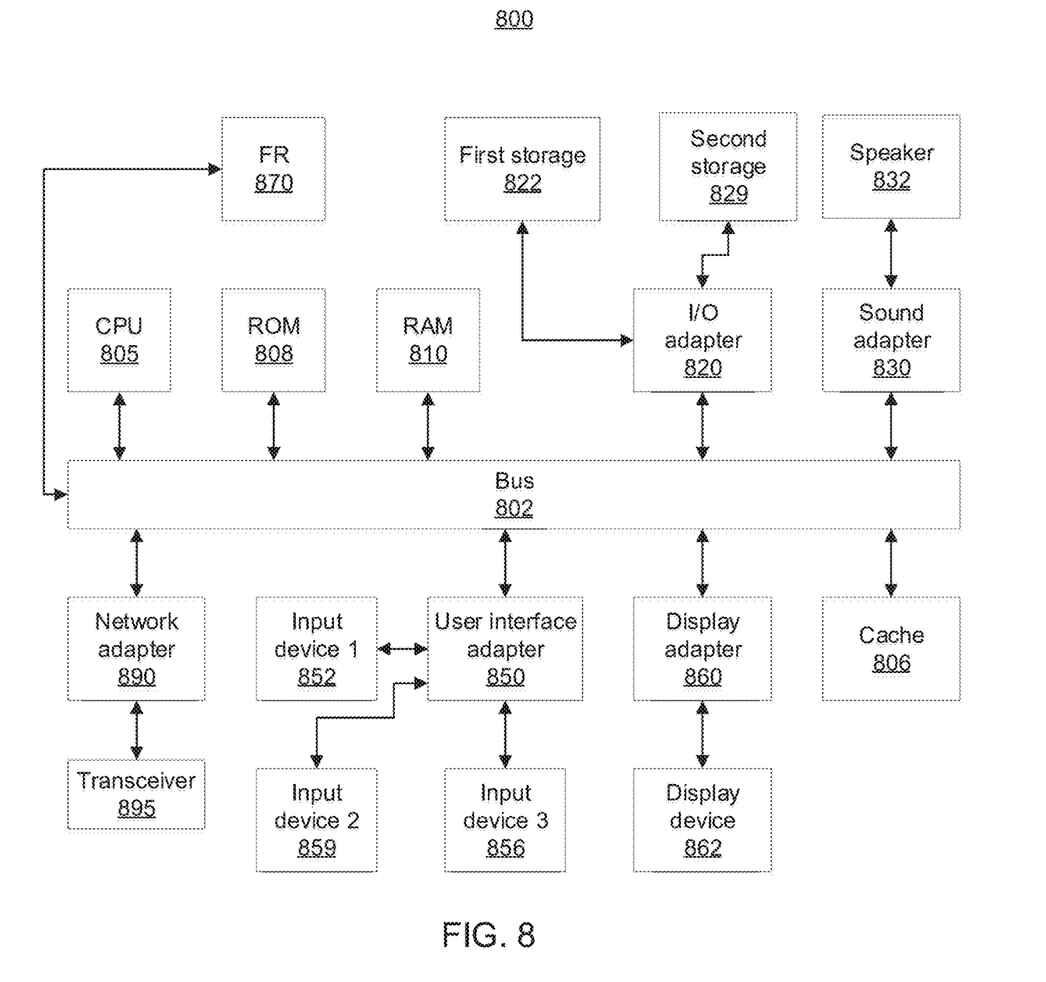
FIG. 8 is a block/flow diagram illustrating a computer system, in accordance with an embodiment the present invention.

Referring now to FIG. 8, an exemplary computer system 800 is shown which may represent a server or a network device, in accordance with an embodiment of the present invention. The computer system 800 includes at least one processor (CPU) 805 operatively coupled to other components via a system bus 802. A cache 806, a Read Only Memory (ROM) 808, a Random-Access Memory (RAM) 810, an input/output (I/O) adapter 820, a sound adapter 830, a network adapter 890, a user interface adapter 850, and a display adapter 860, are operatively coupled to the system bus 802.

A first storage device 822 and a second storage device 829 are operatively coupled to system bus 802 by the I/O adapter 820. The storage devices 822 and 829 can be any of a disk storage device (e.g., a magnetic or optical disk storage device), a solid state magnetic device, and so forth. The storage devices 822 and 829 can be the same type of storage device or different types of storage devices.

A speaker 832 may be operatively coupled to system bus 802 by the sound adapter 830. A transceiver 895 is operatively coupled to system bus 802 by network adapter 890. A display device 862 is operatively coupled to system bus 802 by display adapter 860.

A first user input device 852, a second user input device 859, and a third user input device 856 are operatively coupled to system bus 802 by user interface adapter 850. The user input devices 852, 859, and 856 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 852, 859, and 856 can be the same type of user input device or different types of user input devices. The user input devices 852, 859, and 856 are used to input and output information to and from system 800.

Failure recommendation (FR) component 870 may be operatively coupled to system bus 802. FR component 870 is configured to perform one or more of the operations described above. FR component 870 can be implemented as a standalone special purpose hardware device, or may be implemented as software stored on a storage device. In the embodiment in which FR component 870 is software-implemented, although shown as a separate component of the computer system 800, FR component 870 can be stored on, e.g., the first storage device 822 and/or the second storage device 829. Alternatively, FR component 870 can be stored on a separate storage device (not shown).

Of course, the computer system 800 may also include other elements (not shown), as readily contemplated by one of skill in the art, as well as omit certain elements. For example, various other input devices and/or output devices can be included in computer system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 800 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for implementing automated information technology (IT) system failure detection, recommendation, and mitigation for a large-scale software system coupled with a plurality of types of hardware components, comprising:

performing log pattern learning to automatically generate sparse time series for each log pattern for a set of classification logs corresponding to a failure;

performing multivariate log time series extraction of logs generated during execution of the large-scale software system coupled with the plurality of types of hardware components based on the log pattern learning to generate a failure signature for the set of classification logs, including representing the sparse time series as a compressed run-length encoded sequence, the representation of the sparse time series as the compressed run-length encoded sequence being generated for each log pattern to improve efficiency and speed of storage and computation during the extraction and the detection, the classification logs being stored in structured and unstructured format;

calculating a similarity distance between the failure signature for the set of classification logs and each failure signature from a failure signature model file using sparse dynamic time warping (DTW), the DTW complexity being quadratic based on a number of observations;

determining a failure label for the failure corresponding to a most similar known failure based on a most likely system failure determined by the calculated similarity distance; and automatically mitigating the system failure by returning the system to a normal operation state based on the determined failure label, the failure label being associated with a correct mitigation solution, updated with detected unknown related failures and solutions, and stored in a knowledge database for future access.

2. The method of claim 1, further comprising synchronizing log pattern identifiers corresponding to the set of classification logs against the failure signature model file, wherein the similarity distance is further computed based on the log pattern synchronization.

3. The method of claim 1, wherein calculating the similarity distance further includes finding intersection and union sets between log patterns from the set of classification logs and log patterns from the failure signature model file, and obtaining a final normalized similarity distance representing a similarity between an unknown failure log signature and a particular failure category in the failure signature model file.

4. The method of claim 3, wherein determining the failure label further includes implementing a ranking scheme by comparing the final normalized similarity distance to a threshold.

5. The method of claim 1, further comprising implementing a learning stage to learn the failure signature model file, including:

receiving a set of training logs corresponding to a known failure;

performing log pattern learning and multivariate log time series extraction based on the set of training logs; and generating the failure signature model file based on the log pattern learning and multivariate log time series extraction.

6. The method of claim 1, further comprising implementing an update stage to update the failure signature model file, including:

receiving a set of update logs including one or more known failure logs;

performing log pattern learning and multivariate log time series extraction based on the set of update logs; and updating the failure signature model file based on the log pattern learning and multivariate log time series extraction.

7. A computer program product comprising a non-transitory computer readable storage medium having program instructions embodied therewith, the program instructions executable by a computer to cause the computer to perform a method for implementing automated information technology (IT) system failure detection, recommendation, and mitigation for a large-scale software system coupled with a plurality of types of hardware components, the method performed by the computer comprising:

performing log pattern learning to automatically generate sparse time series for each log pattern for a set of classification logs corresponding to a failure;

performing multivariate log time series extraction of logs generated during execution of the large-scale software system coupled with the plurality of types of hardware components based on the log pattern learning to generate a failure signature for the set of classification logs, including representing the sparse time series as a compressed run-length encoded sequence, the representation of the sparse time series as the compressed run-length encoded sequence being generated for each log pattern to improve efficiency and speed of storage and computation during the extraction and the detection, the classification logs being stored in structured and unstructured format;

calculating a similarity distance between the failure signature for the set of classification logs and each failure signature from a failure signature model file using sparse dynamic time warping (DTW), the DTW complexity being quadratic based on a number of observations;

determining a failure label for the failure corresponding to a most similar known failure based on a most likely system failure determined by the calculated similarity distance; and automatically mitigating the system failure by returning the system to a normal operation state based on the determined failure label, the failure label being associated with a correct mitigation solution, updated with detected unknown related failures and solutions, and stored in a knowledge database for future access.

8. The computer program product of claim 7, wherein the method further includes synchronizing log pattern identifiers corresponding to the set of classification logs against the failure signature model file, and wherein the similarity distance is further computed based on the log pattern synchronization.

9. The computer program product of claim 7, wherein calculating the similarity distance further includes finding intersection and union sets between log patterns from the set of classification logs and log patterns from the failure signature model file, and obtaining a final normalized similarity distance representing a similarity between an unknown failure log signature and a particular failure category in the failure signature model file.

10. The computer program product of claim 9, wherein determining the failure label further includes implementing a ranking scheme by comparing the final normalized similarity distance to a threshold.

11. The computer program product of claim 7, wherein the method further includes implementing a learning stage to learn the failure signature model file, including:

receiving a set of training logs corresponding to a known failure;

performing log pattern learning and multivariate log time series extraction based on the set of training logs; and generating the failure signature model file based on the log pattern learning and multivariate log time series extraction.

12. The computer program product of claim 7, wherein the method further includes implementing an update stage to update the failure signature model file, including:

receiving a set of update logs including one or more known failure logs;

performing log pattern learning and multivariate log time series extraction based on the set of update logs; and updating the failure signature model file based on the log pattern learning and multivariate log time series extraction.

13. A system for implementing automated information technology (IT) system failure detection, recommendation, and mitigation for a large-scale software system coupled with a plurality of types of hardware components, comprising:

a memory device for storing program code; and at least one processor device operatively coupled to a memory device and configured to execute program code stored on the memory device to:

perform log pattern learning to automatically generate sparse time series for each log pattern for a set of classification logs corresponding to a failure;

perform multivariate log time series extraction of logs generated during execution of the large-scale software system coupled with the plurality of types of hardware components based on the log pattern learning to generate a failure signature for the set of classification logs by representing the sparse time series as a compressed run-length encoded sequence, the representing of the sparse time series as the compressed run-length encoded sequence being generated for each log pattern to improve efficiency and speed of storage and computation during the extraction and the detection, the classification logs being stored in structured and unstructured format;

calculate a similarity distance between the failure signature for the set of classification logs and each failure signature from a failure signature model file using sparse dynamic time warping (DTW), the DTW complexity being quadratic based on a number of observations;

determine a failure label for the failure corresponding to a most similar known failure based on a most likely system failure determined by the calculated similarity distance; and automatically mitigate the system failure by returning the system to a normal operation state based on the determined failure label, the failure label being associated with a correct mitigation solution, updated with detected unknown related failures and solutions, and stored in a knowledge database for future access.

14. The system of claim 13, wherein the at least one processor device is further configured to execute program code stored on the memory device to synchronize log pattern identifiers corresponding to the set of classification logs against the failure signature model file, and wherein the similarity distance is further computed based on the log pattern synchronization.

15. The system of claim 13, wherein the at least one processor device is further configured to calculate the similarity distance by finding intersection and union sets between log patterns from the set of classification logs and log patterns from the failure signature model file, and obtaining a final normalized similarity distance representing a similarity between an unknown failure log signature and a particular failure category in the failure signature model file.

16. The system of claim 15, wherein the at least one processor device is further configured to determine the failure label further by implementing a ranking scheme by comparing the final normalized similarity distance to a threshold.

17. The system of claim 13, wherein the at least one processor device is further configured to execute program code stored on the memory device to:
implement a learning stage to learn the failure signature model file by:
receive a set of training logs corresponding to a known failure;
perform log pattern learning and multivariate log time series extraction based on the set of training logs; and
generate the failure signature model file based on the log pattern learning and multivariate log time series extraction performed on the set of training logs; and
implement an update stage to update the failure signature model file by:
receive a set of update logs including one or more known failure logs;
perform log pattern learning and multivariate log time series extraction based on the set of update logs; and
update the failure signature model file based on the log pattern learning and multivariate log time series extraction performed on the set of update logs.

* * * * *